United States Patent [19]
Reinhard et al.

[11] 4,355,549
[45] Oct. 26, 1982

[54] SAFETY SWITCH FOR SMALL TRANSMISSION

[75] Inventors: Anton J. Reinhard, Fredericktown; Hans Hauser, Chippewa Lake, both of Ohio

[73] Assignee: The J. B. Foote Foundry Co., Fredericktown, Ohio

[21] Appl. No.: 92,534

[22] Filed: Nov. 8, 1979

[51] Int. Cl.³ .............................................. B60K 41/06
[52] U.S. Cl. ........................................ 74/850; 74/878; 123/179 K
[58] Field of Search .................... 74/878, 843, 850; 123/179 K; D15/149; 200/61.88, 61.91

[56] References Cited

U.S. PATENT DOCUMENTS

| | | | |
|---|---|---|---|
| Re. 26,633 | 7/1969 | Musgrave | 74/375 |
| D. 201,996 | 8/1965 | Musgrave | D15/149 |
| D. 208,213 | 8/1967 | Hauser | D15/149 |
| 3,285,361 | 11/1966 | Baker | 123/179 K |
| 3,521,612 | 7/1970 | Santi et al. | 74/850 X |
| 3,563,110 | 2/1971 | Hauser | 74/473 R |
| 3,601,231 | 8/1971 | Kolacz et al. | 74/850 X |
| 3,613,482 | 10/1971 | Benson, Jr. et al. | 74/850 |
| 3,689,775 | 9/1972 | Smith et al. | 123/179 K |
| 3,747,437 | 7/1973 | Hauser | 74/850 |
| 3,811,020 | 5/1974 | Johnson et al. | 74/850 |
| 4,214,137 | 7/1980 | Hartley | 200/81.9 X |

*Primary Examiner*—Leslie A. Braun
*Attorney, Agent, or Firm*—Allen D. Gutchess, Jr.

[57] ABSTRACT

This invention relates to a safety switch for a small transmission to prevent operation of an engine when the transmission is in gear. The transmission can have an H-shaped shifting pattern with the engine being capable of starting only when a gear shift lever of the transmission is in neutral. The switch and preferably being made mostly of plastic material.

9 Claims, 5 Drawing Figures

SAFETY SWITCH FOR SMALL TRANSMISSION

This invention relates to a safety switch for use with a small transmission to prevent starting of an engine when the transmission is in gear.

The small transmission with which the safety switch is used is commonly of the type employed with such machines or vehicles as lawnmowers, garden tractors, snowblowers, tillers, golf carts, snowmobiles, all-terrain vehicles, and the like. With the safety switch, the engines of such machines or vehicles can be started when the transmission is only in neutral to minimize the possibility of personal injury or damage if the engine is started with the vehicle in gear.

The small transmission with which the safety switch is used can be of the type having an H-shaped shifting pattern with three forward speeds and one reverse. A shift lever of the transmission extends through a plastic switch slider located in an elongate channel of a plastic terminal housing. The slider has a U-shaped conductor which is spring loaded against the bottom of the housing channel. The bottom of the channel also has two offset terminal buttons which are positioned so that both are engaged by the conducting strip only when the shift lever is in neutral. Terminals of the buttons are then electrically connected to close a safety circuit and enable the engine to be started.

The new safety switch is of low cost construction, having minimum parts which are of relatively simple design, with the slider and the terminal housing each being of one-piece plastic material. AT the same time, the switch is of high reliability and is relatively maintenance free.

It is, therefore, a principal object of the invention to provide a safety switch for a small transmission having the objects and advantages discussed above.

Many other objects and advantages of the invention will be apparent from the following detailed description of a preferred embodiment thereof, reference being made to the accompanying drawings, in which.

Figure 1:
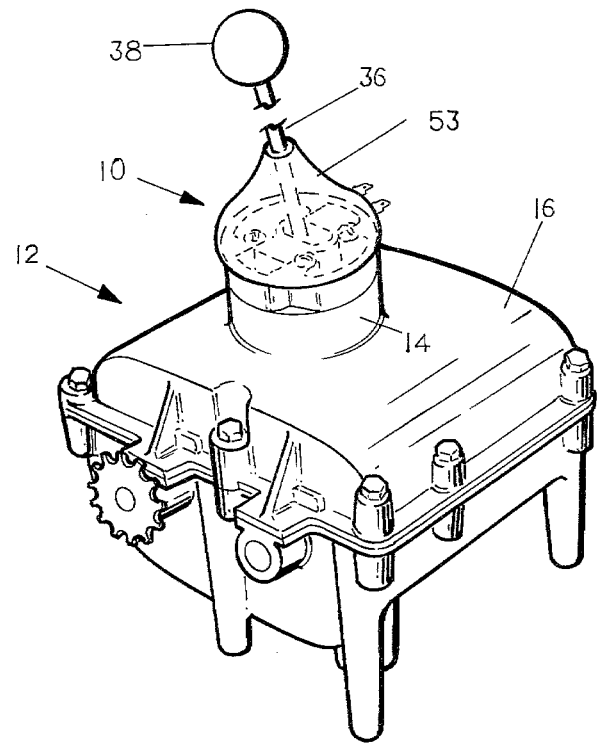
FIG. 1 is a somewhat schematic view in perspective of a small transmission employing a safety switch in accordance with the invention.
Figure 2:
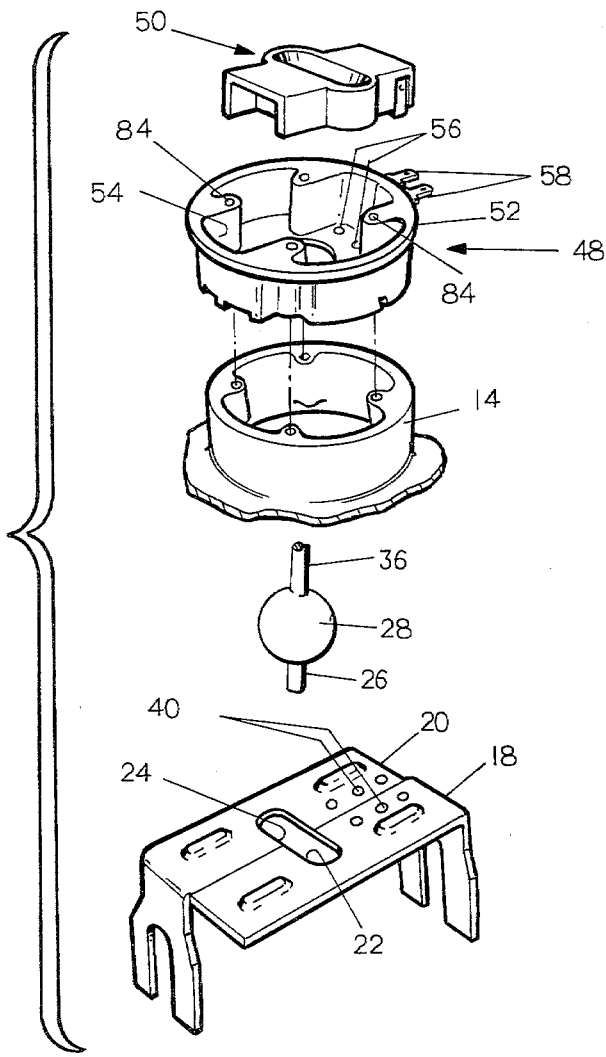
FIG. 2 is an exploded view in perspective of portions of the transmission and the safety switch of FIG. 1.
Figure 5:
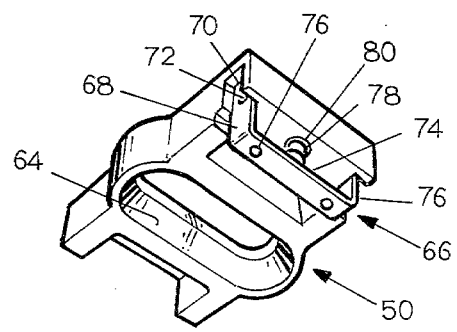
FIG. 5 is a bottom view in perspective of a component of the safety switch.

Referring to the drawings, and particularly to FIG. 1, a safety switch 10 is employed with a three-speed transmission 12, being located on a projecting portion 14 of a transmission housing 16. Referring to FIG. 2, shift mechanism comprises two shifter forks 18 and 20 located in side-by-side relationship and having semi-circular notches 22 and 24 therein to receive a shift rod 26. The shifting arrangment is of a type well-known in the art and will not be discussed in detail. The three-speed transmission 12 is commercially available, and is also shown in U.S. Pat. No. D-208,213. A more detailed explanation of similar shifter forks can be found in U.S. Pat. No. 3,563,110 or in U.S. Pat. No. Re. 26,633. The shifter forks 18 and 20 can be individually moved longitudinally, but not together, this being accomplished through a locking plate (not shown). Hence, when the shift rod 26 is in either of the notches 22 or 24, the corresponding shifter fork 18 or 20 can be longitudinally moved by the rod, if the other fork is in neutral. However, if the rod 26 is partially engaged in both notches, neither fork can be moved. In addition, if either fork is out of the neutral position, the other fork cannot be moved.

As viewed in FIG. 2, when the shifter fork 20 is moved toward the left from neutral, the transmission is in the third speed forward. When the fork 20 is moved to the right, the transmission is in the second speed forward. When the fork 18 is moved to the left from neutral, the transmission is in the first speed forward and when the fork 18 is moved to the right, the transmission is in reverse.

Figure 3:
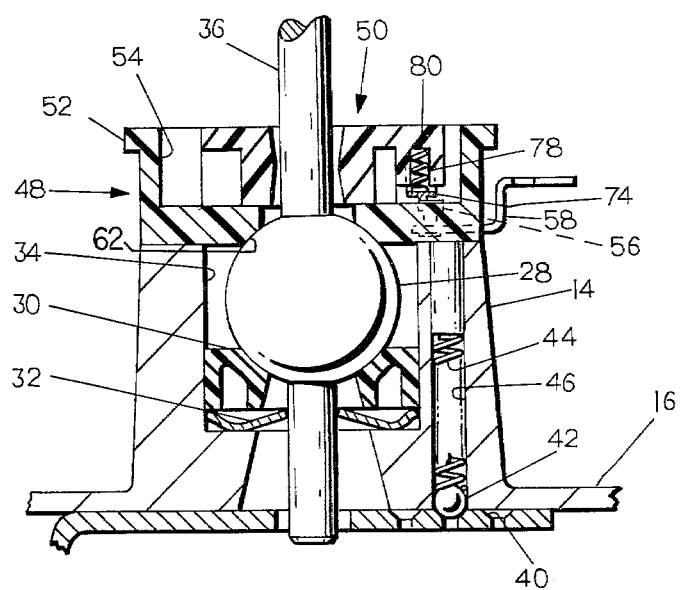
FIG. 3 is a view in vertical cross section taken through a portion of the transmission and the safety switch, with the transmission in neutral.

The shift rod 26 is affixed to and depends from a shift ball 28 which is rotatably supported on a socket 30 (FIG. 3) and a spring 32 in a chamber 34 of the projecting portion 14 of the transmission housing 16. A shift lever 36 extends upwardly from the shift ball 28 and terminates in a handle 38 (FIG. 1). The shifter forks and the shift lever constitute shift means for the transmission 12.

When either of the shifter forks 18 and 20 is in any of the three positions, it is aided in being held in that position by any one of three recesses or notches 40 (FIG. 3) which receives a spring-loaded detent ball 42 which is urged downwardly by a coil spring 44 in a bore 46.

The safety switch 10 basically comprises a terminal housing 48 and a switch slider or member 50 moveable with respect thereto. Both of these components are preferably made of one-piece plastic material. The terminal housing 48 has a peripheral shape generally similar to that of the projecting portion 14 of the transmission housing 16, with a circular upper lip 52. A flexible boot 53 (FIG. 1) has a large end engaged with the lip 52 and a small end engaged with an intermediate portion of the shift lever 36. The terminal housing 48 forms an elongate channel 54, in the bottom of which are molded two terminal buttons 56 offset and spaced transversely of the channel 54. Two terminals 58 are electrically connected to the terminal buttons 56 and extend outside the housing 48 to receive conductors of a safety circuit which can be connected to the terminals by suitable clips. The channel 54 also has a central opening 60 therein through which the shift lever 36 extends and the bottom of the housing 48 has an annular recess 62 (FIG. 3) around the opening 60 shaped like a segment of a sphere to form an upper seat for the ball 28 of the shift lever 36.

The switch slider 50 has an elongate central opening 64 therein which extends transversely of the housing channel 54. The elongate opening 64 receives an intermediate portion of the shift lever 36 and the lever can move back and forth in the elongate opening 64 without moving the slider 50, as the lever moves the shift rod 26 back and forth in a neutral position between the notches 22 and 24 of the shifter forks 18 and 20. When the shift lever 36 is moved parallel to the shifter forks 18 and 20 and longitudinally of the housing channel 54, it moves one of the shifter forks 18 and 20 from the neutral position to an engaged position. When this occurs, the lever 36 moves the slider 50 longitudinally in the channel 54.

The end of the slider 50 over the terminal button 56 carries a U-shaped conducting strip 66. The conducting strip 66 has upwardly extending legs 68 received in guide recesses 70 and upper end portions of the legs 68 have inwardly extending projections 72 which cooperate with lips (not shown) at the lower ends of the recesse 70 to prevent the conducting strip from separating from the slider 50 when the switch is disassembled. The conducting strip 66 also has a long straight web portion 74 connecting the legs 68, with the web having two projecting contacts 76. The contacts are spaced apart a distance equal to the transverse spacing of the terminal buttons 56. The conducting strip 66 is urged downwardly against the channel 54 by a central coil spring 78 seated in a recess 80 of the slider 50.

Figure 4:
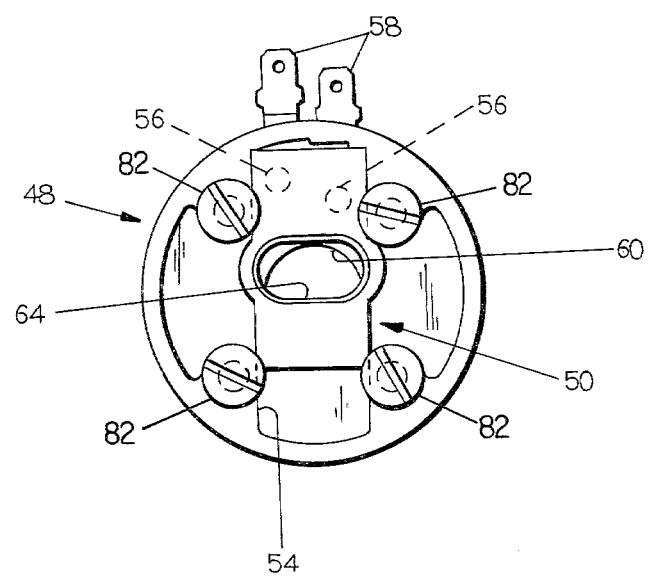
FIG. 4 is a plan view of the safety switch, with the transmission in an engaged position.

Four large-headed screws or fasteners 82 FIG. 4, or smaller screws with washers, extend through bores 84 in the terminal housing 48 to fasten the housing to the projecting portion 14 of the transmission housing 16. As the same time, the heads of the screws 82 serve to retain the slider 50 in the channel 54 of the housing. With the flexible boot 53, no further cover is required for the safety switch 10.

In the operation of the switch, when the shift lever 36 is in the neutral position (FIG. 3) and the slider 50 is in the neutral position, the contacts 76 of the conducting strip 66 will be in contact with the terminal buttons 56 to complete a circuit between the terminals 58. The safety circuit associated therewith, then enables the engine with which the transmission 12 is used to be started. When either of the shifter forks 18 and 20 is in an engaged position and the slider 50 is moved longitudinally in the channel 54 (see FIG. 4) by the shift lever 36, then one of the contacts 76 will be spaced from the corresponding terminal button 56 so that there will be no electrical path between the terminal 58. The safety circuit then prevents the engine from being started when the transmission is in a gear-engaged position.

From the above, it will be seen that the safety switch in accordance with the invention constitutes relatively few parts and parts which can be molded of plastic material, resulting in low manufacturing costs. The switch is also relatively maintenance free and reliable in operation. It is also light in weight and requires little extra space so that the transmission can be used with a variety of machinery and vehicles.

Various modifications of the above-described embodiment of the invention will be apparent to those skilled in the art, and it is to be understood that such modifications can be made without departing fropm the scope of the invention, if they are within the spirit and the tenor of the accompanying claims.

We claim:

1. A transmission including shift means having at least one gear-engaged position and a neutral position, said transmission including a housing, said shift means comprising two adjacent shifter forks linearly moveable in parallel paths and a shift lever having a shift rod selectively engagable with either of said shifter forks, a terminal housing affixed to said transmission housing and having an opening through which said shift lever extends, said terminal housing having two terminals extending therefrom, said terminal housing forming an elongate channel with two terminal buttons positioned transversely in the bottom of said channel and electrically connected with said terminals, a switch slider located in said elongate channel and having an elongate slot extending transversely to the longitudinal extent of said channel, with said shift lever extending through said elongate slot, and an end of said slider having a conducting strip extending transversely across the lower surface thereof and positioned to contact both of said terminal buttons when said shift lever is in the neutral position.

2. A transmission according to claim 1 characterized by said conducting strip having upturned legs received in guide recesses in an end portion of said switch slider and having a central coil spring received in a central recess in the end of said switch slider and urging said conducting strip toward the bottom of said channel.

3. A transmission according to claim 1 characterized by said switch slider being held in said channel by four threaded fasteners having large head means extending over and contacting upper edge portions of said switch slider, said threaded fasteners also extending through said terminal housing and affixing said terminal housing to said transmission housing.

4. A transmission according to claim 3 characterized by a flexible boot having a small end engaging an intermediate portion of said shift lever and a large end engaging a peripheral portion of said terminal housing.

5. A transmission according to claim 1 characterized by said shift lever having an intermediate shift ball rotatably supported in said housing, and said terminal housing having a segmented spherical surface on a lower surface thereof around said shift lever opening and engaging an upper portion of said shift ball.

6. A safety switch for a transmission having a shift lever with an intermediate shift ball, said shift lever being moveable between a neutral position and at least one gear-engaged position, said safety switch comprising a plastic terminal housing having an opening through which the shift lever can extend, said terminal housing having a segmented spherical surface on a lower surface thereof around said opening for engaging an upper portion of the shift ball, said terminal housing having two terminals extending therefrom, said housing forming an elongate channel opening upwardly with two terminal buttons positioned transversely therein and electrically connected with said terminals, a one-piece, plastic switch slider located in said elongate channel and having an elongate slot extending transversely to the longitudinal extent of said channel through which an intermediate portion of the shift lever can extend, and an end of said slider having a spring-loaded conducting strip extending transversely thereacross and positioned to contact one of said terminal buttons when the shift lever is in the gear-engaged position and contact both of said terminal buttons when said shift lever is in the neutral position.

7. A safety switch according to claim 6 characterized by said terminal buttons being located in the bottom of said elongate channel, said conducting strip extending transversely across the lower surface of said switch slider in a transverse recess in the lower surface thereof, said conducting strip having upturned legs received in guide recesses in the end of said switch slider and having a central spring urging said conducting strip toward the bottom of said channel.

8. A safety switch according to claim 6 characterized by said switch slider being held in said channel by four threaded fasteners having large head means extending over and contacting uppr edge portions of said switch slider, said threaded fasteners also extending through said terminal housing for affixing said housing to the transmission.

9. A safety switch according to claim 8 characterized by a flexible boot having a large end engaging a peripheral portion of said terminal housing and having a small end for engaging an intermediate portion of the shift lever.

* * * * *

UNITED STATES PATENT OFFICE
CERTIFICATE OF CORRECTION

Patent No. 4,355,549         Dated  October 26, 1982

Inventor(s) Anton J. Reinhard et al

It is certified that error appears in the above-identified patent and that said Letters Patent are hereby corrected as shown below:

In the Abstract, penultimate line, after "switch", insert --is of low cost construction, utilizing a minimum number of parts--

In the specification, column 1, line 32, change "AT" to --At--

Column 3, line 46, change "fropm" to --from--

Column 3, line 53, change "linearly" to --lineally--

Column 4, line 59, change "uppr" to --upper--

Signed and Sealed this

Eighteenth Day of January 1983

[SEAL]

Attest:

GERALD J. MOSSINGHOFF

Attesting Officer        Commissioner of Patents and Trademarks